United States Patent [19]
Castle et al.

[11] 3,759,363
[45] Sept. 18, 1973

[54] LETTER SPACE CONTROL MECHANISM

[75] Inventors: William Harold Castle, Winchester; Harry Michael Jacobs; Lowell Thomas Sloan, both of Lexington, all of Ky.

[73] Assignee: International Business Machines Corporation, Armonk, N.Y.

[22] Filed: Dec. 22, 1971

[21] Appl. No.: 210,874

[52] U.S. Cl. .................................. 197/84 R, 197/15
[51] Int. Cl. ............................................. B41j 19/58
[58] Field of Search ................... 197/15, 16, 19, 20, 197/82, 83, 84 R, 84 A, 84 B

[56] References Cited
UNITED STATES PATENTS

| | | | |
|---|---|---|---|
| 2,348,261 | 5/1944 | Nicks .............................. | 197/84 A |
| 2,581,200 | 1/1952 | Norton ............................ | 197/84 B |
| 2,831,558 | 4/1958 | Toggenburger .................. | 197/84 B |
| 3,018,870 | 1/1962 | Lambert et al................... | 197/84 B |
| 3,288,262 | 11/1966 | Salto ............................... | 197/84 R |
| 2,405,974 | 8/1946 | Norton ............................ | 197/84 B |
| 2,862,595 | 12/1958 | Toggenburger .................. | 197/84 B |
| 2,954,861 | 10/1960 | Roggenstein et al............. | 197/84 B |
| 2,996,165 | 8/1961 | Morris............................. | 197/84 R |
| 3,181,682 | 5/1965 | Elsner et al. ..................... | 197/84 B |
| 3,225,886 | 12/1965 | Cetran et al..................... | 197/84 R |
| 3,310,148 | 3/1967 | Lennon ........................... | 197/84 R |
| 3,334,720 | 8/1967 | Hickerson........................ | 197/16 X |
| 3,346,086 | 10/1967 | Cralle et al. ..................... | 197/91 X |
| 3,404,766 | 10/1968 | Castle et al...................... | 197/16 X |
| 3,547,245 | 12/1970 | Okcuoglu et al................ | 197/84 R X |

*Primary Examiner*—Ernest T. Wright, Jr.
*Attorney*—E. Ronald Coffman et al.

[57] ABSTRACT

A set of selectively active stop pins cooperate with measured openings in a control plate to limit letter feed motion in either the forward or reverse direction. The measuring plate opening includes two effective portions that are alternately selectable to provide two different measuring calibrations. A preferred alternate calibration is known in the art as "EXPAND" where all measurements are increased by a fixed amount. Fixed increment spacing is obtained by suppressing the measuring pin selection through an override device, thereby allowing control to be accomplished by a normally active measuring pin in cooperation with the measuring plate. By providing all measuring mode control at the measuring plate, it becomes unnecessary to modify the space control information generated in the typewriter keyboard.

10 Claims, 9 Drawing Figures

Patented Sept. 18, 1973

Patented Sept. 18, 1973  3,759,363

Patented Sept. 18, 1973

LETTER SPACE CONTROL MECHANISM

BACKGROUND OF THE INVENTION

U. S. Pat. No. 3,713,524 discloses a typewriter having a letter space control mechanism employing a transport member that is impositively driven to a limit defined by a selectively positioned stop. The stop determines the length of transport motion and hence the feed increment size. Provision was made for moving the print point either forwardly or reversly through much of the same mechanism.

Control of the proportional space selection is ordinarily accomplished from an encoding device or possibly a translating device in the keyboard or input area of the typewriter. This device generates a space control code or mechanical output indicating the amount of space to be concurrent with a print cycle. Conveniently, letter space can be considered in terms of non-dimensional space units of which all letter space increments are even multiples. For example, a lower case *i* might require a three unit space increment whereas a lower case *m* might require a five unit space increment. Ordinarily upper case letters require a larger space than lower case letters. It is the function of the encoder or translator to make these basic space selections.

It is often desired to modify the basic space selection to accommodate a more versatile range of typing applications. A common feature called "EXPAND" provides for somewhat increased spacing for all letters to provide a bold typing appearance. The "EXPAND" function could, of course, be accomplished by modifying the encoding or translating mechanism of the typewriter to simply provide a different control output to the space increment measuring device. Our invention, however, approaches the "EXPAND" selection question at the feed increment measuring device thereby simplifying the encoding or translating mechanism.

Since the printing function is ordinarily accompanied by a letter space operation, it is convenient to construct the printer to automatically produce a letter space operation any time a print cycle is operated. Occasionally it is desired to omit the space operation. This has traditionally been accomplished by severing a linkage leading to the space operating device. Our invention inhibits the space function by encoding the non-feed operation in the space control device to simply provide a zero net space measurement. The zero space measurement is achieved through actual measurement of a single unit backspace to compensate for a small forward space increment that invariably is produced with each print operation. By this approach to the non-feed function, it is possible to omit the use of severable linkages.

Our multiple mode feed device takes particular advantage from the use of one-sixtieth of an inch as a basic spacing unit. This spacing unit has the unique property of being conveniently small to provide reasonable high quality proportional spacing, i.e., three to seven units of variation in character width. Also, the one-sixtieth of an inch spacing unit can be evenly multiplied into the most common fixed pitch letter width of 10 and 12 characters per inch. Thus, the six unit measurement provides a one-tenth of an inch character width and the five unit measurement provides one-twelfth of an inch character width. The selection of fixed pitch operation thus is simplified by providing the space measuring device with a normally active configuration that will measure either five or six units depending upon a fixed prior selection. This prior selection is conveniently provided by the same mechanism that selects the normal or "EXPAND" proportional spacing mode. The normally active selection is deactivated in the proportional spacing mode when a character width of greater than five or six units is desired. Fixed pitch spacing thus is readily accomplished simply by suppressing the proportional spacing encoder output rather than modifying its internal operation. This output is readily suppressed since it is preferred to employ impositive pneumatic actuators to provide the output selection.

These and other objects, features and advantages of our letter feed mechanism will be apparent to those skilled in the art from the following more specific description of a preferred illustrative embodiment of our invention wherein reference is made to the accompanying drawing of which:

Figure 1:
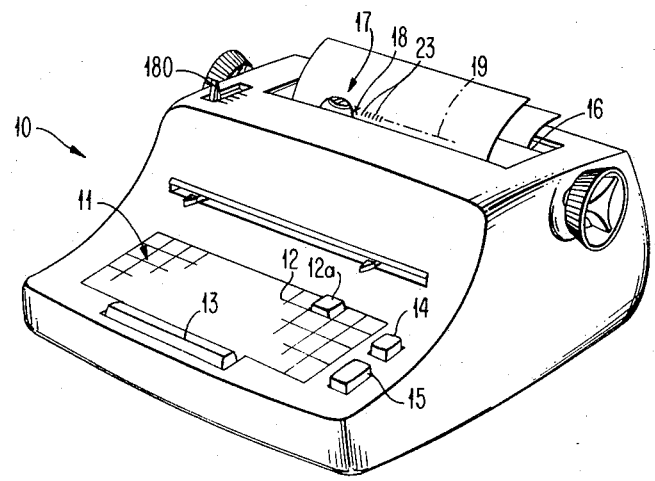
FIG. 1 is a perspective view of a typewriter or similar serial printer employing a letter feed mechanism and constructed in accordance with our invention.

Turning now more specifically to the drawing, in FIG. 1 there is shown a typewriter or similar printer 10 of the type generally described in U. S. Pat. No. 2,919,002. The typewriter 10 has a operator controllable input keyboard 11 including character selection keys 12, a forward space key or spacebar 13, a backspace key 14, a case shift key 15, and other suitable keys for controlling other printer functions. The typewriter 10 further includes a paper support platen 16 and an adjacent character-by-character printing mechanism 17 which mutually cooperate to define a printing point 18.

The printing mechanism 17 is movably supported to enable the positioning of the printing point 18 horizontally along a writing line 19.

Figure 2:
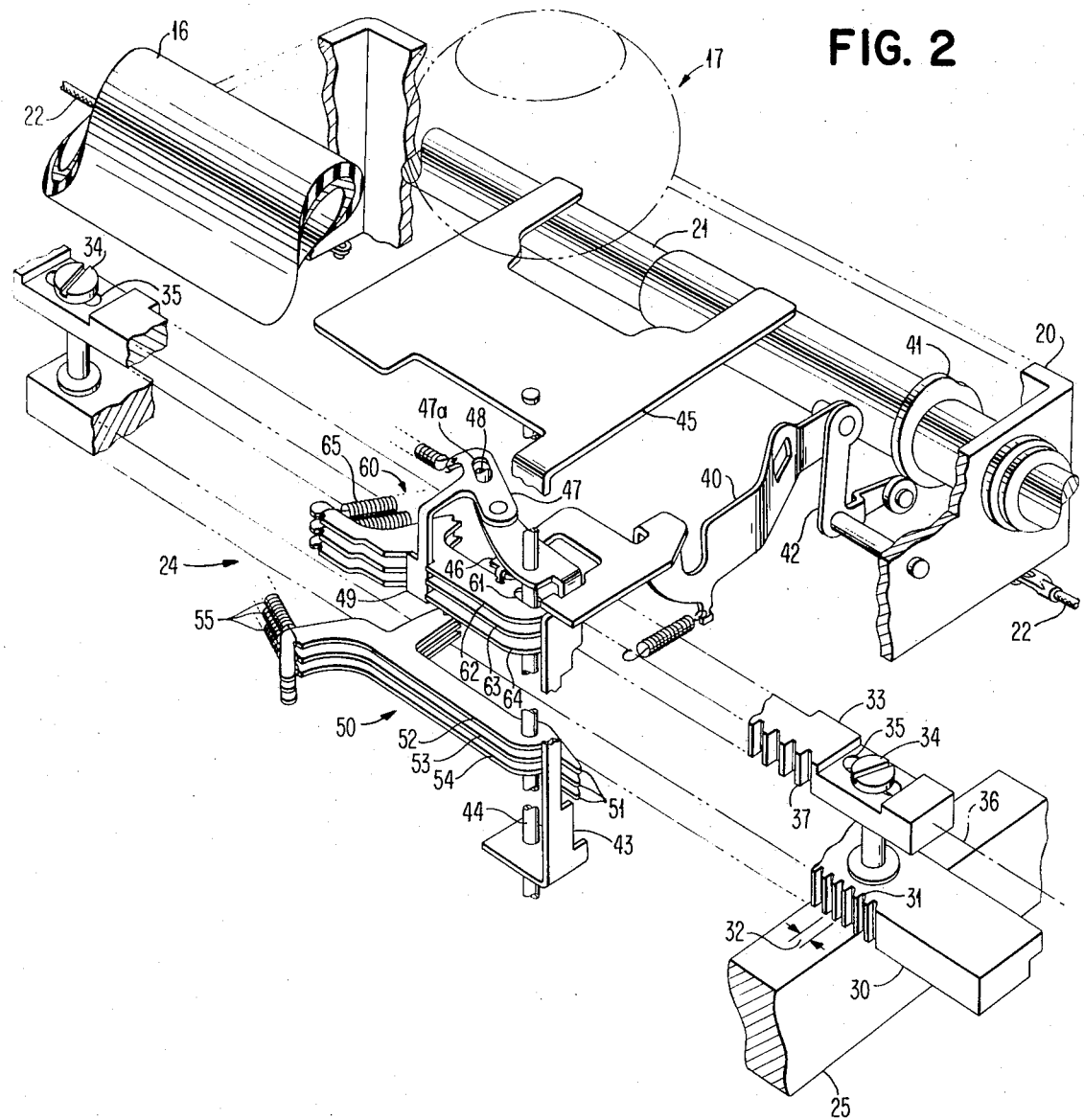
FIG. 2 is a fragmentary rear perspective view of a portion of the letter feed mechanism employed in our invention.

Referring to FIG. 2, the printing mechanism 17 is mounted on a carrier frame 20 that slides laterally on track structure provided in part by cyclically rotatable print shaft 21. A spiral main spring (not shown) is mounted within the typewriter body and is connected through flexible cables 22 to the carrier 20. The carrier 20 is thus yieldably urged forwardly (to the right in FIG. 1 and to the left in FIG. 2) by the main spring. A selectively engagable carrier return clutch device (not shown) is also connected to the carrier 20 in the reverse direction (to the left in FIG. 1 and to the right in FIG. 2). This mechanism is more fully described in the "IBM "SELECTRIC" Instruction Manual" published Jan. 1966, Form Part No. 241-5032-2, published by International Business Machines Corporation, Armonk, N.Y.; particularly at pages 3, 4, 42, and 52-55.

The printing point 18 is positionable at any of a plurality of fixed, equally spaced stable locations 23 (FIG. 1) along the writing line 19 by a shuttle rack system 24 similar in many ways to that shown particularly in FIG. 2 and more completely described in aforesaid U.S. Pat. No. 3,713,524. The shuttle rack system 24 comprises a substantially stationary holding rack 30 having teeth 31 along its length for securing the printing point 18 at the incremental locations 23. The teeth 31 are spaced by a fixed distance or interval 32 which, as hereinafter described, is preferably selected to be one-tenth of an inch.

A shiftable transport or shuttle rack 33 is slideably mounted adjacent the stationary rack 30 in superimposition therewith. A pair of pins 34 are mounted in suitable portions of the typewriter frame 25 and engage slots 35 in the shiftable rack 33 to guidingly support the rack 33 for lateral sliding movement along a path 36 that is substantially parallel to the writing line 19.

As more fully described in aforesaid U.S. Pat. No. 3,713,524 the holding rack 30 and shuttle rack 33 are alternately connected to the type element carrier 20 by respective holding and transport pawl groups 50 and 60.

A cycle interconnecting or phasing link 40 is driven by a print shaft operated cam 41 through a bellcrank 42. The phasing link 40 engages a pawl lift bracket 43 that is pivoted on a rod 44 carried by a plate 45 on the carrier 20. In addition, phasing link 40 provides direct control to an arm 46 to lift the transport pawl group 60 from the rack 33. In the rest position of the mechanism, the holding pawl group 50 is in engagement with the teeth 31 of the rack 30 while the transport pawl group 60 is held outwardly spaced from the rack 33 by the arm 46 of the phasing link 40. During a print operation the rack 33 is positioned a measured amount from a home position by mechanism hereinafter described. Cam 41 then drives phasing link 40 rightwardly to pivot control bracket 43 counter-clockwise and withdraws arm 46 from the transport pawl group 60. Pawl group 60 thus is inserted into the teeth 37 of rack 33. Subsequently, bracket 43 engages tails 51 of the holding pawl group 50 to withdraw the holding pawl group 50 from rack 30. The continued movement of the phasing link 40 drives a wedging lever 47 against its guide stud 48 which engages slot 47a therein to bring member 49 against the back edges of the transport pawl group 60 to spread the pawl 62, 63 and 64 axially as permitted by mounting slots 61 to minimize all clearance with the teeth 37 of rack 33. This action allows the carrier 20 to be accurately transported either to the right or to the left by the motion of rack 33. After the rack 33 has repositioned the carrier 20, cam 41 will have turned to allow restoration of the phasing link 40. This restoration first causes reinsertion of the holding pawl group 50 into rack 30 and subsequent withdrawal of the transport pawl group 60 from the transport rack 33.

Figure 3A:
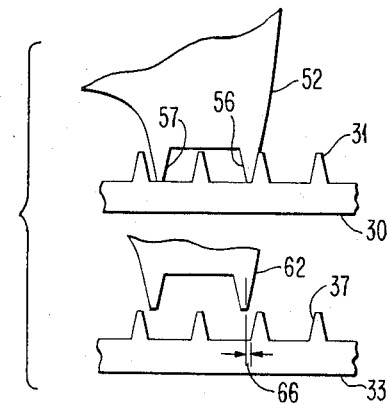
FIGS. 3A and 3B are diagramatic operational view of typical pawls employed in the letter feed mechanism showing respectively the condition of parts at two significant points in the letter feed operation.

Pawl group 50 comprises three independent pawls 52, 53 and 54 which are pivoted on the rod 44. Individual springs 55 normally urge the pawls 52, 53 and 54 of group 50 against the teeth 31 of the rack 30. The configuration of a typical pawl 52 is shown in FIG. 3A. The pawl 52 has a forward tooth 56 and a rearward tooth 57. The pawls 53 and 54 have similar forward and rearward teeth all of which are staggered to provide six teeth each located at discrete one-sixtieth of an inch intervals but displaced in forward and rearward groups. These six teeth, being spaced at discrete one-sixtieth of an inch intervals, will span an effective total of one-tenth of an inch and thereby be assured of engaging one of the holding rack teeth 31 to define the stable positions 23 of the printing mechanism 17 at 1/60 of an inch increments throughout the entire writing line 19.

Figure 3B:
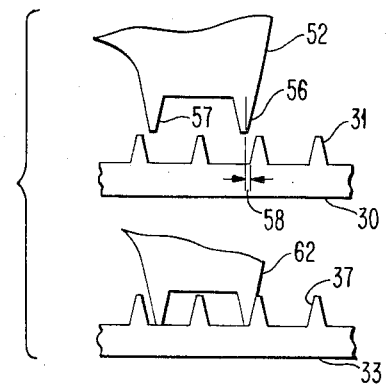

The transport pawl group 60 comprises individual pawls 62, 63, and 64 each having mounting slots 61 that receive the support rod 44 to provide for the axial spreading motion of the pawls 62, 63 and 64 described above as well as for pivotal motion. Individual springs 65 connected to the pawls 62, 63, 64 are oriented to hold the pawls 62, 63 and 64 normally against the leftward edge of the rod 44. The pawls 62, 63, 64 have teeth (see FIG. 3A and 3B for example) similar to those on the holding pawls 52, 53 and 54 to provide an engagement resolution in combination with the teeth 37 on the shiftable rack 33 that is equal to the 1/60 of an inch resolution of the holding pawls 52, 53 and 54 on the rack 30. FIGS. 3A and 3B respectively shows individual pawls 52 and 62 of the groups 50 and 60 in relation to the teeth 31 and 37 of the racks 30 and 33. FIG. 3A shows a typical position just prior to insertion of pawl group 60 into rack 33. FIG. 3B shows a typical position just prior to re-insertion of pawl group 50 into the holding rack 30.

The effective position of the transport pawl group 60 is offset from the effective position of the holding pawl group 50 by a necessary clearance increment 66 as shown by the individual pawls 52 and 62 in FIG. 3A. The clearance increment 66 assures friction free entry of the transport pawl group 60 into the shiftable rack 33. A similar clearance increment 58 (See FIG. 3B) is required when the pawl group 50 is to be re-inserted into rack 30. While these clearance increments need only be greater than some predetermined reliability minimum, we prefer to make these clearance increments 58 and 66 as large as possible (one half a space unit of 1/120 in.) for maximum reliability. It will be apparent to those skilled in the art that these clearance increments 58 and 66 will allow some forward movement of the carrier 20 by the urging of the mainspring each time the pawl groups 50 and 60 are interchanged. This forward motion is readily compensated for in the permitted motion of rack 33 as hereinafter described in accordance with well known principles of mechanical design.

Figure 4:
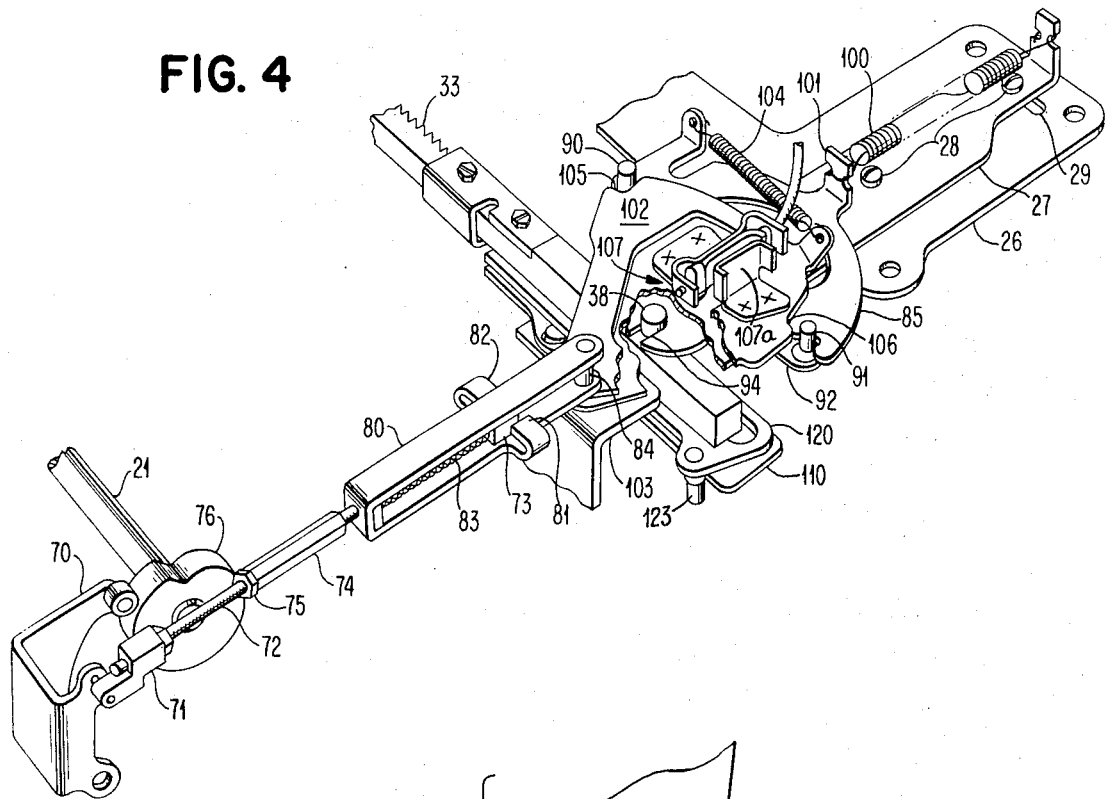
FIG. 4 is a fragmentary front perspective view of a further portion of the letter feed mechanism employed in our invention.

The mechanism for holding the rack 33 in a home position and for providing impositive driving motion to the rack 33 is shown in FIG. 4. Cam follower 70 is connected through a offset clevis block 71 to a threaded rod 72 having a square block head 73 at its rearwardmost end. The block head 73 is guided within the arms of a yoke 80 and edges of bent-up tab portions 81 and 82 for axial sliding motion. A compression spring 83 is trapped between the block head 73 and the left end of yoke 80 to enable the transfer of limited force from the cam follower 70 to the yoke 80. An elongated nut 74 is threaded on the rod 72 and secured in place by a lock nut 75 to define a limit of lost motion between the rod 72 and the yoke 80. The shuttle rack 33 is normally retained in what may be termed a home position which is intermediate of its permissable displacement provided by the slot 35 (FIG. 2) to permit movement in either the forward or reverse letter feed direction. This home position is maintained by the normal urging of the compression spring 83 (FIG. 4) acting against the forward end of the yoke 80 that is connected through a pin 84 to a sector shaped drive plate 85.

The drive plate 85 engages a pair of spaced pins 90 and 91 on a T-shaped lever 92 that is mounted by pivot shaft 93 on adjustable plate 27 (FIG. 5) to a frame plate 26 and is connected through a fork 94 to a pin 38 on the shiftable rack 33. Since the drive plate 85 and the T-shaped lever 92 are both pivotally mounted, the engagement of pins 90 and 91 under urging of spring 83 cause the mechanism to seek a stable centered position. This position can be adjusted by the location of auxilliary mounting bracket or plate 27 on the frame plate 26 by screws 28 which are adjustably secured in slots 29.

The mechanism shown in FIG. 4 operates during each rotation of print cycle shaft 21 to provide impositive displacement of the rack 33 either to the right or to the left of the position shown, followed by direct powered, but force limited, displacement of the rack 33 back to its home position as shown. Actual letter spacing of the print point 18 is accomplished during this latter cam driven movement. Cam follower 70 normally rests near the hi-dwell of cam 76 in print shaft 21. Rotation of the print shaft 21 thus allows the follower 70 to move clockwise under force supplied by a spring 100 connected between the auxilliary mounting bracket 27 and an upturned tab 101 on the plate 85. A direction selecting sector-shaped plate 102 is pivotally connected to the pin 84 and moves rearwardly with the yoke 80 and the plate 85.

A frame mounted bracket 103 contains a slot (not shown) extending normal to the rack 33 to guide the pin 84 in its movement. The plate 102 is normally biased by a spring 104 connected between the plate 102 and the plate 85 to a counter-clockwise displaced position about the pin 84 where a notch portion 105 traps the pin 90. A similar notch 106 on the plate 102 is non-aligned with a pin 91 in the normal or forward spacing condition. Rearward movement of the pin 84 and the plates 102 and 85 thus will pivot the T-shaped lever 92 clockwise about its pivot 93 to drive the rack 33 leftwardly through pin 38. The extent of leftward motion will be limited by a stop mechanism hereinafter described in detail. Cam follower 70 follows the fall of cam 76 until the rack 33 is arrested by the stop mechanism. As cam 76 presents a rise portion to the follower 70, the rod 72 will be drawn forwardly to thereby drive the plate 85 and pin 90 back to the home position. This forward motion continues until plate 85 eventually contacts both pins 90 and 91 with equal force and spring 83 is again re-compressed by the overthrow of cam 76 beyond the motion necessary to restore the rack 33 to its home position.

Rightward displacement of the rack 33 as is required for backspace motion, is accomplished in a similar manner. A pneumatic expansible chamber backspace or reverse feed select actuator 107 is supported on plate 85 and has an output that bears against angle bracket 107a that is welded to plate 102. The actuator 107 preferably is of the type disclosed in U. S. Pat. No. 3,703,853. When actuator 107 is actuated upon back-space selection the plate 102 is displaced from its position as shown against the force of spring 104 to a position where notch 106 traps pin 91 and notch 105 misses pin 90. Rotation of print shaft 21 and rearward movement of cam follower rod 72 and plate 102 now drives the pin 91 rearwardly to pivot the T-shaped plate 92 counter-clockwise thereby drawing rack 33 rightwardly by the pin 38. Once the notch 106 has engaged the pin 91 and the T-shaped plate 92 begins to pivot counter-clockwise, the pin 90 thereon moves forwardly to trap the plate 102 in its displaced position. Accordingly, the actuator 107 need not be maintained active during the entire driving operation.

FEED INCREMENT MEASURING PLATE

Actual measurement of the spacing increment is accomplished through a feed increment measuring plate 110 (see FIGS. 5 and 6) that limits the displacement of the shiftable rack 33. The rack 33 has a connecting bracket 120 secured thereon to provide the operative connection with the feed increment measuring plate 110. A pair of sliding studs 121 are guided in tracks 130 on a frame mounted bracket 131 and extend through opposed ends of an elongated slot 132 of the plate 110 into connecting opening 122 in the bracket 120. Plate 110 thus is guided or constrained to move right and left with the rack 33. The elongated slot 132, however, permits the plate 110 to be displaced along path 111 which is at right angles to the motion of the rack 33 to provide either of two effective measuring paths 112 and 113 hereinafter explained. The bracket 120 further includes a downwardly extending pin 123 that engages a groove 133 in the frame mounted bracket 131 to further stabilize the guiding movement of the plate 110.

Figure 7:
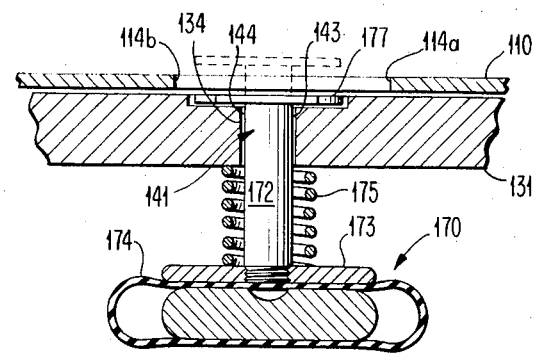
FIG. 7 is an elevational cross-section view taken along line VII — VII of FIG. 5 illustrating a construction detail of the mechanism shown therein.

As hereinafter explained in greater detail, the plate 110 is driven by the rack 33 until it is intercepted by an arresting surface on one of five selectively active stop pins including five and seven unit stop pin 140, non-feed stop pin 150, six unit stop pin 141, three unit stop pin 142, and single unit backspace stop pin 160. Each of the stop pins 140, 150, 141, 142 and 160 is connected to an impositive, two position, expansible chamber actuator 170. The actuators 170 also are preferably like that disclosed in aforesaid U.S. Pat. No. 3,703,853. These actuators 170 have respective input conduits 171 connected to suitable translating or encoding mechanism within the keyboard 11 for actuating one or more of the stop pins 140, 150, 141, 142, 160 depending upon the spacing operation desired. The structure of the pins 140, 150, 141, 142 and 160 is generally similar with the exception of pin 140 and is typically illustrated by the pin 141 shown in FIG. 7. The pin 141 is supported in a bore 134 of the bracket 131 and is thereby guided for vertical movement. A stem 172 extends downwardly from the pin 141 and is connected to an actuator output plate 173. The actuator 170 has a displaceable wall 174 that engages the output plate 173 and is activatable to lift the pin 141 to the broken line position shown against a restore spring 175. The spring 175 is compressed between the bottom of the bracket 131 and the top of the output plate 173. The output plate 173 is guided for vertical movement by a pin 176 connected thereto that rides in a slot 135 in an actuator mounting block 136 connected to the bracket 131.

At the upper end of the pin 141 there is provided a thin latch plate portion 177 that is visible also in FIG.

5. The latch plate portion 177 is elongated in the direction of motion of the rack 33 and functions to hold the pin 141 in its elevated position even after de-actuation of the actuator 170. The feed measuring plate 110 includes an opening 114 into which the pin 141 is projected. Movement of the measuring plate 110 with the rack 33 will bring a portion of the plate 110 under the elevated lower edge of the latch plate portion 177. The pin 141 thus will be retained in its active position until the plate 110 is again restored to move out from under the latch plate portion 177.

Figure 6:
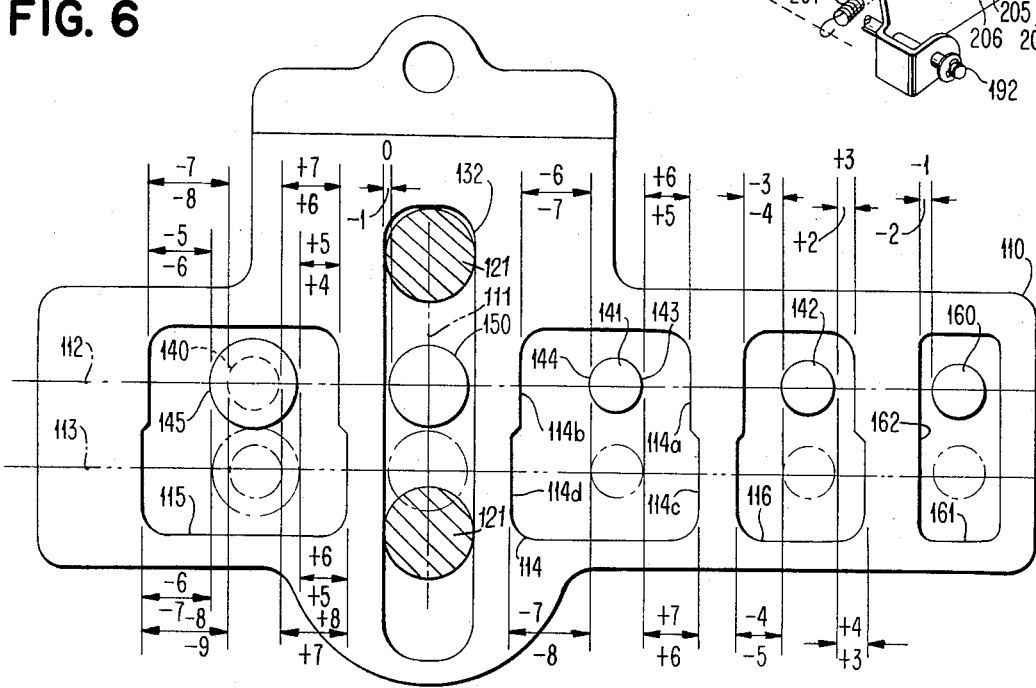
FIG. 6 is a detail plan view of the primary elements of the space measuring mechanism also shown in FIG. 5.

FIG. 6 shows a layout of the feed increment measuring plate 110. The plate 110 includes three letter space measuring openings 114, 115 and 116. In addition, the plate 110 has a single unit backspace measuring opening 161. The slot 132, described above, also serves as a dead key or non-feed measuring opening. Although the details of all measuring openings 114, 115, 116, 132 and 161 are shown in FIG. 6, a specific description is provided only for the opening 114 and its cooperating stop pin 141.

When pin 141 is activated by its actuator 170 it will define one of four predetermined measuring spacings in accordance with the current mode of operation of the typewriter 10. These spacings are determined by the distance between the lateral arresting surfaces 143 and 144 of the pin 141 and a first plurality of stop edge surfaces 114a and 114b along path 112 or alternatively with a second plurality of stop edge surfaces 114c and 114d along path 113. Stop edges 114c and 114d preferably define one unit greater spacing than edges 114a and 114b, however, it is to be understood that any even multiple different spacing could be accomodated.

If the typewriter 10 is in a forward proportional spacing mode measuring path 112 is effective and edge surface 143 effectively measures six units of forward spacing upon reciprocation of the shiftable rack 33. This measurement is accomplished by adding the one unit clearance increment of forward space that accompanies the transfer of pawl groups 50 and 60 into and out of their respective racks 30 and 33, to the five units of measuring spacing between pin arresting surface 143 and the opening stop surface 114a. The resulting six units measured is shown above the related dimension line whereas the actual five units of spacing is shown below the dimension line. The "plus" sign associated with the numbers adjacent the dimension line indicates forward motion, whereas the "minus" sign shown with other dimension lines indicates backspace motion. Six units of backspace motion is accomplished by the spacing of seven units between backspace arresting surface 144 of the pin 141 and stop edge 114b of the opening 114. This seven unit motion less the inherent one unit clearance increment of forward space motion that accompanies pawl transfer produces the six unit backspace desired.

When the typewriter 10 is in the "EXPAND" mode of operation the plate 110 is moved with respect to the pin 141 as shown by the chain line position of pin 141 in FIG. 6 where it lies in the measuring path 113. In this mode of operation a spacing of 6 units exists between forward space measuring arresting surface 143 of the pin 141 and expand stop edge 114c of the opening 114. This six-unit spacing will produce a measurement of a seven units forward space in the forward proportional spacing mode. Similarly, eight units of spacing exists between the backspace arresting surface 144 of the pin 141 and the backspace expand stop edge 114d of the opening 114. These eight units plus the one unit clearance increment of forward space that accompanies pawl transfer produce seven units of backspace in the expand mode.

From the foregoing specific description of pin 141 and the opening 114, it can now be understood how forward and reverse proportional spacing, with expand capability is obtained for a proportional spacing system having letter width of either 3, 5, 6, or 7 basic units. Activation of pin 141 as described above in the normal proportional spacing mode produces six units of forward space. Three units of space is selected by activation of pin 142. Five units of forward space is selected by not activating any of the pins 140, 150, 141, 142 or 160. Under this condition, pin 140, which normally is inactive, supports a normally active arresting surface or disc 145 which defines the desired five units of spacing within its opening 115. Activation of pin 140 displaces the disc 145 upwardly out of the opening 115 and brings the pin 140 into its active position for measuring seven units of normal forward spacing. Changing the typing mode to expand simply adds one additional unit to each of the values thus identified.

Figure 5:
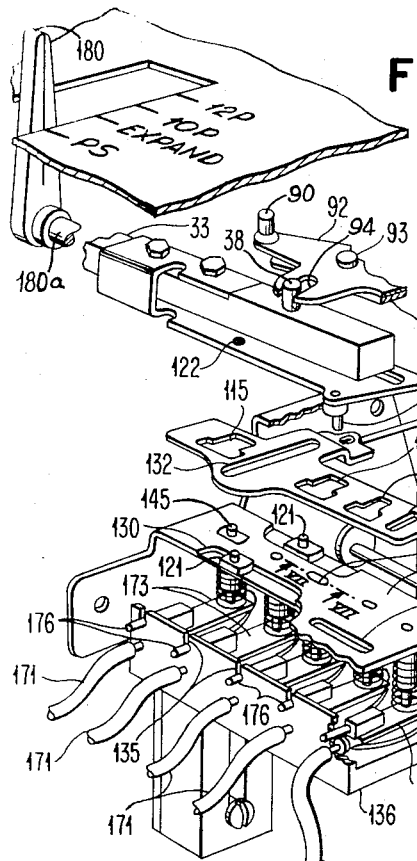
FIG. 5 is a partially exploded fragmentary front perspective view of a still further portion of the letter feed mechanism employed in our invention.

Conveniently, five units of spacing at one-sixtieth of an inch per unit provides a letter-feed increment of one-twelfth of an inch or the exact spacing desired for 12 pitch typing. Since the five unit measuring disc 145 is active in the absence of any pin movement, it becomes possible to obtain 12 pitch letter feed simply by suppressing all pin movement as hereinafter described. Furthermore, with the plate 110 in its expand position where the pins 140, 150, 141, 142 and 160 bear a relative position indicated by the chain lines in FIG. 6, the normally active arresting disc 145 selects six units of spacing. These six units at one-sixtieth of an inch per unit provide a letter-fed increment of one-tenth of an inch which is exactly the space desired for 10 pitch typing. It thus can be seen that the selection of either 10 or 12 pitch typing is reduced to a simple matter of suppressing proportional space controlling pin movement and selecting the desired operative position of the plate 110. Mechanism for accomplishing these actions is shown in FIG. 5 under control of a manually operable four position mode control lever 180.

MODE SELECTION

The mode control lever 180 directly pivots a shaft 180a and a link 181 having a mode control pin 182 at its lower end for engaging respective actuating surfaces 190 and 200 on a pair of operating bellcranks 191 and 201. Bellcrank 191 is pivoted on shaft 192 to the typewriter frame 25 and is connected through an upper arm 193 and a pull rod 194 to the plate 110 for displacing the plate 110 along path 111 transversly of the shiftable rack 33. Bellcrank 201 is connected to a two-position actuator inhibit or override bracket 202 which pivots on shaft 202a to selectively prevent output movement of those actuators 170 which operate the letter feed control pins 140, 141 and 142. The actuating surfaces 190 and 200 are suitably notched to provide both position control of the bellcranks 191 and 201 and stable detenting of the mode control lever 180 in its four operative positions.

The actuating surface 190 of the bellcrank has a first notch 195 and a second notch 196 separated by a land portion 197. With the pin 182 located in either notch 195 or 196, the bellcrank 191 is pivoted counterclockwise to locate the plate 110 in its normal proportional space position for effective movement along path 112 relative to, as shown by the full line position, the pins 140, 150, 141, 142, 160 in FIG. 6. Alternatively with the pin 182 in engagement with the land portion 197, the bellcrank 191 is pivoted clockwise against its spring 198 to pull the plate 110 to its expand position.

Figure 8:
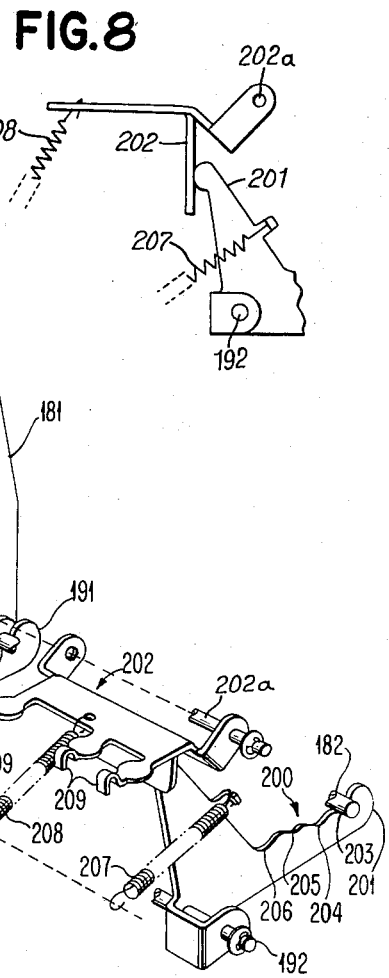
FIG. 8 is a fragmentary side elevational view of a construction detail of FIG. 5.

The actuating surface 200 of the bellcrank 201 includes notches 203, 204, 205 and 206. The notches 203 and 204 are deeper than the notches 205 or 206 such that pin 182 when engaged with notches 203 or 204 allows spring 207 to pivot bellcrank 201 counterclockwise about its pivot axis shaft 192. The actuator inhibit bracket 202 (see also FIG. 8) is thus pivoted against the force of spring 208 to a position where fingers 209 thereof are spaced upwardly from the actuators 170 so as not to interfere with their operation. Engagement of pin 182 with notches 205 or 206, on the other hand, pivots the bellcrank 201 clockwise about shaft 192 and against the force of spring 207 to allow the inhibit bracket 202 to be driven counterclockwise by its spring 208 to a position where the fingers 209 engage each of the actuators 170 to inhibit the pin lifting output therefrom. Since the actuators 170 are simple pneumatic expansible chamber devices coupled by flexible tubing 171 there is sufficient give in the system to allow complete inhibition of the output by the inhibiting bracket 202.

It can now be seen that in its position as shown, the mode control lever 180 selects ordinary proportional spacing by allowing both bellcranks 191 and 201 to be pivoted to their counter-clockwise position thereby positioning the plate 110 for effective movement along path 112 as in FIG. 6, and also holding the inhibit bracket 202 in its non-inhibiting position where fingers 209 are spaced from the actuators 170.

Movement of mode control lever 180 to its second position marked "EXPAND" in FIG. 5 places the pin 182 on land portion 197 of the bellcrank 191 and in deep notch 204 of bellcrank 201. In this position, bellcrank 191 is pivoted to its clockwise position placing the plate 110 in the expand mode for movement along path 113 shown in FIG. 6.

The bellcrank 201 remains however in its counterclockwise position thereby holding the bracket 202 out of inhibiting contact with the actuators 170. In this position, typing is performed with proportionally spaced letters that are one unit greater in spacing than with the mode control lever 180 in its first position.

Movement of the mode control lever 180 to its third position marked "10P" in FIG. 5 places the pin 182 on land portion 197 of bellcrank 191 and on the shallow notch 205 of bellcrank 201. In this position the bellcrank 201 is displaced clockwise to pivot the inhibit bracket 202 to a position preventing raising of the pins 140, 150, 141, 142 and 160. The plate 110, however, remains in its expand position for movement along path 113. Since proportional spacing is inhibited by the fingers 209, the normally active stop disc 145 will be continuously effective to arrest the plate 110 during reciprocation of rack 33. In the expand mode this produces an invariable space measurement of six units which at one-sixtieth of an inch per unit, is equivalent to ten characters per inch.

Finally, with the mode control lever 180 displaced to the far rearward position indicated by the designation "12P" in FIG. 5, the pin 182 cooperates with the notch 196 of bellcrank 191 and with the shallow notch 206 of the bellcrank 201. In this position, proportional spacing is still inhibited by the bracket 202 whereas the bellcrank 191 is allowed to move to its counterclockwise most position where the plate 110 is positioned for movement along path 112. The normally active arresting disc 145 thus invariably measures a five unit space upon reciprocation of the rack 33 to thereby produce 12 pitch letter spaced increments.

BACKSPACE

As described in the aforementioned U. S. Pat. No. 3,713,524 it is desirable to provide for backspace that is proportional to the characters typed and, in the case of fixed pitch typing, to provide corresponding fixed pitch backspace. Further, as described in aforesaid patent application, Ser. No. 51,124, the typewriter keyboard 11 includes suitable mechanical-to-pneumatic logic capable of providing pneumatic output signals indicating the desired spacing information. Part of this information includes the direction of spacing desired which is applied to the actuator 107. It is further desired to obtain a single unit backspace function in order that the printing point can be positioned by the operator at any of its stable positions defined by the shuttle rack system 24. This single unit backspace is performed in our invention by performing an ordinary backspace operation with the selection of pin 160 as the measuring device. Pin 160 defines spacing two units in the backspace direction relative to the stop edge surface 162 of the opening 161 in the plate 110. This same two unit spacing exists in both the normal and expand condition since it is desirable that the single unit be available in both the standard proportional and expand proportional typing mode. As described above, the two unit spacing is necessary to accomodate the one unit forward space clearance increment that is inherent in the pawl transfer operation.

DEAD KEY OR NON-FEED

It is desirable for a typewriter to be capable of going through most of the motion of a print cycle without actually causing a letter feed operation. A typical example of this desirability is in the printing of so-called diacritical characters such as "".

By inhibiting the letterfeed operation the diacritical character can be typed and the character that it modifies can be typed directly therebeneath without the need of interposing a backspace operation. As described above, a print cycle in our invention invariably produces, a pawl transfer sequence as described above, and this sequence inherently produces a one unit forward space due to the clearance increment. To achieve a non-feed print cycle, we provide a stop pin 150 lying in the slot or opening 132 in the plate 110 having a minus one unit spacing therebetween by which the one unit clearance increment forward space accompanying pawl transfer may be negated. A non-feed operation thus is translated by the logic within the keyboard 11 in response to depression of a key such as accent key 12a to select the backspace operation by activation of the backspace selection actuator 107 and selection of pin 150 to measure off a single unit backspace which when subtracted from the single unit forward space inherent in pawl transfer produces a total of no motion of the print point.

Although a specific embodiment of our invention has been described above for purposes of illustration, those skilled in the art will recognize the various modifications, deletions and additions that can be made to the structure without departing from the inventive concepts disclosed. The subject matter sought to be patented, thus, is to be defined and limited solely by the appended claims.

We claim:

1. A typewriter having a frame, character-by-character printing mechanism, paper support mechanism mounted adjacent said printing mechanism and defining a printing point therebetween, means mounting at least one of said mechanisms for lateral movement relative to the other of said mechanisms to enable positioning of said printing point along a writing line, incremental securing means connected between said frame and said one mechanism for retaining said printing point at any of a plurality of fixed equally spaced locations along said writing line; feed increment measuring means operatively associated with said one mechanism for limiting displacement of said printing point along said writing line including a movable plate defining at least a first plurality of stop surfaces, selectively positionable stop means including arresting surfaces alignable with respect to said stop surfaces and normally spaced therefrom by predetermined distances, and impositive cyclic drive means for moving said first plurality of stop surfaces of said plate along at least a first path into engagement with individual arresting surfaces to measure feed increments of said one mechanism, wherein the improvement comprises:

means normally positioning one of said arresting surfaces in active arresting alignment with an associated stop surface on said plate, impositive actuator means for positioning different ones of said arresting surfaces into alignment with the first path of said stop surfaces, an overriding member mounted adjacent said actuator means and having a first position for overriding said actuator means and a second position of non-interference with the operation of said actuator means, a mode control member, detent means for establishing at least two stable positions for said mode control member, and first linkage means interconnecting said mode control member and said overriding member for positioning said overriding member in one of said first and second positions when said mode control member is in a first one of said two stable positions and for positioning said overriding member in the other of said first and second positions when said mode control member is in a second one of said two stable positions.

2. A typewriter as defined in claim 1, wherein:

said stop means comprises a plurality of individually positionable two-position stop members, each providing at least one of said arresting surfaces, and said stop surfaces of said movable plate comprise individual surface portions aligned in the first path of said stop surfaces with said arresting surfaces and wherein the improvement further comprises:

said actuator means comprising individual impositive two-position actuators individually connected to said stop members for displacing respective stop members between arresting and non-arresting positions.

3. A typewriter as defined in claim 2 wherein said impositive actuators comprise expansible chamber pneumatic devices.

4. A typewriter as defined in claim 1 further comprising:

means supporting said movable plate for movement along a second path that is transverse to the first path, a second plurality of aligned stop surfaces formed on said movable plate and displaced from said first plurality of stop surfaces along said second path, whereby said movable plate is positionable in either a first position wherein said arresting surfaces are aligned along the first path with said first plurality of stop surfaces or in a second position wherein said arresting surfaces are aligned along the first path with said second plurality of stop surfaces, the stop surfaces of said second plurality of stop surfaces, each being individually spaced from a respective stop surface of said first plurality of stop surfaces in the direction of the first path by fixed increments that are an even multiple of the space between said locations, said detent means further providing a third stable position for said mode control member, and further linkage means interconnecting said mode control member with said movable plate for displacing said movable plate to said second position of said movable plate when said mode control member is in said third stable position.

5. A typewriter as defined in claim 4 wherein said fixed increments are all equal to the space between said locations.

6. A typewriter as defined in claim 4, wherein:

said detent means provides a fourth stable position for said mode control member, and the first linkage means positions said overriding member in said first position of said overriding member and said further linkage means positions said movable plate in said second position of said movable plate when said mode control member is positioned in said fourth stable position.

7. A typewriter as defined in claim 1 wherein said incremental securing means comprises a substantially stationary rack member having teeth thereon at regular intervals along the length of said writing line, a shiftable rack member, superimposed upon said stationary rack member and movable with respect thereto from a fixed home position along a line parallel to said writing line, means urging said movable one of said mechanisms in one direction along said writing line, alternately operative rack engaging means connected with said movable one of said mechanisms and comprising first pawl means for normally engaging said stationary rack member and defining a stable position at each of said equally spaced locations, the distance between said spaced locations being a fixed unit increment that is the minimum differential spacing between all stable positions of said printing points along said writing line, and second pawl means for engaging said shiftable rack member to transmit motion of said shiftable rack member to said movable one of said mechanisms, interconnecting means operated in timed relation with operation of said impositive cyclic drive means to provide substantially in sequence:

shifting of said shiftable rack member,
engagement of said second pawl means with said shiftable rack member,
release of said first pawl means from said stationary rack member,
restoration of said shiftable rack member to said home position,
engagement of said first pawl means with said stationary rack member, and
release of said second pawl means from said shiftable rack member,
said second pawl means having an effective position relative to said stationary rack member that is spaced from the effective position of said first pawl means by a first clearance increment, whereby transfer of engagement of said first pawl means from said stationary rack member and said second pawl means into said shiftable rack member will displace said movable one of said mechanisms relative to said stationary rack member by said clearance increment, said predetermined spacing distances between said stop means and said arresting surfaces being measured to limit displacement of said movable one of said mechanisms to position said first pawl means adjacent one of said stable positions on said stationary rack member and spaced therefrom away from said one direction by a further clearance increment, motion direction control means operatively associated with said impositive cyclic drive means for effectively selecting either forward or reverse movement of said shiftable rack member, said first plurality of stop surfaces comprising surfaces facing the direction of the path of said stop surfaces in opposite senses for engaging said arresting surfaces to measure both forward and reverse feed, where the improvement further comprises:
input control means for selecting a non-feed operation, said stop means including a selectively positionable non-feed arresting surface positioned for selective cooperation with a stop surface of said movable plate, the spacing distance between said non-feed arresting surface and said cooperating stop surface in said reverse direction being no greater than said fixed unit increment and at least equal to the sum of said clearance increment and said further clearance increment, and
means responsive to selection of a non-feed operation by said input control means for operating said motion direction control means to select reverse feed motion of said shiftable rack member, and for actively positioning said non-feed arresting surface.

8. A typewriter as defined in claim 7 wherein the sum of said clearance increment and said further clearance increment is substantially equal to the spacing between adjacent ones of said spaced locations.

9. A typewriter having a frame, character-by-character printing mechanism, paper support mechanism mounted adjacent said printing mechanism and defining a printing point therebetween, means mounting at least one of said mechanisms for lateral movement relative to the other of said mechanisms to enable positioning of said printing point along a writing line, a substantially stationary rack member having teeth thereon at regular intervals along the length of said writing line, a shiftable rack member superimposed upon said stationary rack member and movable with respect thereto from a fixed home position along a line parallel to said writing line, means urging said movable one of said mechanisms in one direction along said writing line, alternately operative rack engaging means connected with said movable one of said mechanisms and comprising first pawl means for normally engaging said stationary rack member and defining a stable position at fixed unit increments along the writing line, said unit increment being the minimum differential spacing between all stable positions of said printing points along said writing line and second pawl means for engaging said shiftable rack member to transmit motion of said shiftable rack member to said movable one of said mechanisms, means for shifting said shiftable rack member by measured distances away from and back to said fixed home position, interconnecting means operated in timed relation with operation of said shifting means to provide substantially in sequence,
shifting of said shiftable rack member,
engagement of said second pawl means with said shiftable rack member,
release of said first pawl means from said stationary rack member,
restoration of said shiftable rack member to said home position,
engagement of said first pawl means with said stationary rack member, and
release of said second pawl means from said shiftable rack member,
said second pawl means having an effective position relative to said stationary rack member that is spaced from the effective position of said first pawl means by a first clearance increment, whereby transfer of engagement of said first pawl means from said stationary rack member and said second pawl means into said shiftable rack member will displace said movable one of said mechanisms relative to said stationary rack member by said clearance increment and said shifting means moves said shiftable rack member to position said movable one of said mechanisms so that said first pawl means is adjacent one of said stable positions on said stationary rack member and is spaced therefrom away from said one direction by a further clearance increment,
motion direction control means operatively associated with said shifting means for effectively selecting either forward or reverse movement of said shiftable rack member, and
wherein the improvement comprises:
input control means for selecting a non-feed operation,
said shifting means including a movable plate defining at least one stop surface and operatively associated with said shiftable rack member for limiting displacement of said printing point along said writing line,
a selectively activatable non-feed arresting member cooperable with said stop surface, and spaced therefrom by a distance no greater than said fixed unit increment and at least equal to the sum of said clearance increment and said further clearance increment, and
means responsive to selection of a non-feed operation by said input control means for operating said motion direction control means to select reverse feed motion of said shiftable rack member, and for selectively activating said non-feed arresting member.

10. A typewriter as defined in claim 9 wherein the sum of said clearance increment and said further clearance increment is substantially equal to said fixed unit increment.

* * * * *